United States Patent
Moizumi et al.

(10) Patent No.: US 10,351,048 B2
(45) Date of Patent: Jul. 16, 2019

(54) HEADLIGHT CONTROL DEVICE

(71) Applicant: Hitachi Automotive Systems, Ltd., Hitachinaka-shi, Ibaraki (JP)

(72) Inventors: Hiroki Moizumi, Ibaraki (JP); Haruki Matono, Ibaraki (JP); Koji Doi, Ibaraki (JP); Takeshi Nagasaki, Ibaraki (JP)

(73) Assignee: HITACHI AUTOMOTIVE SYSTEMS, LTD., Hitachinaka-Shi, Ibaraki (JP)

( * ) Notice: Subject to any disclaimer, the term of this patent is extended or adjusted under 35 U.S.C. 154(b) by 0 days.

(21) Appl. No.: 15/764,405

(22) PCT Filed: Nov. 9, 2016

(86) PCT No.: PCT/JP2016/083153
§ 371 (c)(1),
(2) Date: Mar. 29, 2018

(87) PCT Pub. No.: WO2017/110277
PCT Pub. Date: Jun. 29, 2017

(65) Prior Publication Data
US 2018/0319319 A1  Nov. 8, 2018

(30) Foreign Application Priority Data
Dec. 25, 2015  (JP) .................... 2015-252811

(51) Int. Cl.
*B60Q 1/14* (2006.01)
*B60R 11/04* (2006.01)
(Continued)

(52) U.S. Cl.
CPC ............. *B60Q 1/1423* (2013.01); *B60Q 1/14* (2013.01); *B60R 11/04* (2013.01); *B60R 16/03* (2013.01);
(Continued)

(58) Field of Classification Search
CPC ............ H05B 37/0218; H05B 37/0227; B60Q 1/1423; B60Q 1/143; B60Q 1/1446
(Continued)

(56) References Cited

U.S. PATENT DOCUMENTS

| 7,068,815 B2 * | 6/2006 | Chang ................ G06K 9/00624 382/103 |
| 2005/0036660 A1 * | 2/2005 | Otsuka ................ B60Q 1/1423 382/104 |

(Continued)

FOREIGN PATENT DOCUMENTS

| JP | 2005-092861 A | 4/2005 |
| JP | 2013-206356 A | 10/2013 |
| WO | WO-2015/045504 A1 | 4/2015 |

OTHER PUBLICATIONS

International Search Report and Written Opinion issued in corresponding application No. PCT/JP2016/083153 dated Mar. 7, 2017.

*Primary Examiner* — Tung X Le
(74) *Attorney, Agent, or Firm* — Foley & Lardner LLP (57) ABSTRACT

An increase in the execution period of light distribution control is inhibited by reducing the number of images required for the light distribution control while achieving both object detection and light distribution control function. The present invention has an object detection unit for performing an object detection process, a light point detection unit for performing a light point detection process, and a light distribution control unit for controlling the illumination state of headlights on the basis of the result of the object detection process and the result of the light point detection process.

10 Claims, 5 Drawing Sheets

(51) Int. Cl.
   *B60R 16/03*     (2006.01)
   *H04N 13/204*    (2018.01)
   *G06K 9/00*      (2006.01)
   *G06K 9/32*      (2006.01)

(52) U.S. Cl.
   CPC ....... *G06K 9/00791* (2013.01); *G06K 9/3241* (2013.01); *H04N 13/204* (2018.05); *B60Q 2300/11* (2013.01)

(58) Field of Classification Search
   USPC .......................... 315/77, 82; 307/10.1, 10.8
   See application file for complete search history.

(56) References Cited

U.S. PATENT DOCUMENTS

| | | | |
|---|---|---|---|
| 2008/0062010 A1* | 3/2008 | Kobayashi | G06K 9/00798 340/937 |
| 2013/0027951 A1* | 1/2013 | Takahashi | B60Q 1/085 362/465 |
| 2013/0116857 A1* | 5/2013 | Mitsugi | G06T 7/00 701/1 |
| 2016/0176345 A1* | 6/2016 | Lee | G06K 9/00805 348/148 |
| 2016/0240085 A1 | 8/2016 | Otsuka | |

* cited by examiner

HEADLIGHT CONTROL DEVICE

TECHNICAL FIELD

The present invention relates to a headlight control device that controls a headlight of a vehicle.

BACKGROUND ART

As an example of headlight control for controlling a headlight of a host vehicle, there is light distribution control to detect a preceding vehicle or an oncoming vehicle and switch the headlight of the host vehicle from a high beam to a low beam, to prevent dazzling of a driver of the preceding vehicle or the oncoming vehicle due to the high beam of the headlight of the host vehicle in night travelling. In the light distribution control, a region of high brightness is searched for and extracted as a light spot to detect a taillight of the preceding vehicle or a headlight of the oncoming vehicle from an image imaged by a camera.

When an image is imaged by a shutter subjected to automatic exposure adjustment like a normal external recognition application, an exposure time may be too long, which may result in overexposure, or the exposure time may be too short, which may not extract the light spot accurately. Therefore, in the light distribution control, it is necessary to image an image with a constant exposure time.

However, when the image is imaged with the constant exposure time, exposure times suitable for a distant light source object and a proximal light source object are different from each other. For this reason, images with a plurality of different exposure times such as an image imaged with an exposure time for a distant light spot and an image imaged with an exposure time for a proximal light spot are required.

Because the brightness of the taillight of the preceding vehicle and the headlight of the oncoming vehicle to be extracted as light spots are also different from each other, exposure times suitable for the taillight and the headlight are different from each other. For this reason, images with different exposure times are required for detection of the taillight of the preceding vehicle and for detection of the headlight of the oncoming vehicle.

CITATION LIST

Patent Literature

PTL 1: JP 2005-92861 A

SUMMARY OF INVENTION

Technical Problem

Normally, in an image recognition process such as vehicle recognition and pedestrian recognition, because a recognition target is a non-self-luminous object such as a pedestrian and a vehicle, an image subjected to automatic exposure adjustment is required. For this reason, the same image cannot be used in the image used for the recognition process of the non-self-luminous object and the image used for the light distribution process.

To achieve both existing image recognition process and light distribution control functions in one system, the image for the recognition process and the image for the light distribution control are required. To image the image for the light distribution control and the image for the image recognition other than the image for the light distribution control, it is necessary to alternately change the exposure time of the shutter. Furthermore, because a plurality of images are required for the image for the light distribution control, the number of imaged images increases when all of the images are imaged. An execution period of the light distribution control may increase due to an increase in the number of imaged images and a reaction time from detection of the vehicle to switching of the headlight may increase.

Accordingly, an object of the present invention is to provide a headlight control device that inhibits an increase in the execution period of light distribution control by reducing the number of images required for the light distribution control while achieving both object detection and light distribution control functions.

Solution to Problem

A headlight control device according to the present invention for solving the above problem includes an object detection unit that performs an object detection process on the basis of an image imaged by an imaging device; a light spot extraction unit that performs a light spot extraction process on the basis of the image imaged by the imaging device; and a light distribution control unit that controls an illumination state of a headlight on the basis of a result of the object detection process and a result of the light spot extraction process.

Advantageous Effects of Invention

According to the present invention, an increase in the execution period of light distribution control can be inhibited by reducing the number of images required for the light distribution control while achieving both object detection and light distribution control functions. Further, other problems, configurations, and effects will become apparent from the following description of embodiments.

DESCRIPTION OF EMBODIMENTS

Hereinafter, embodiments of the present invention will be described on the basis of the drawings.

Figure 1:
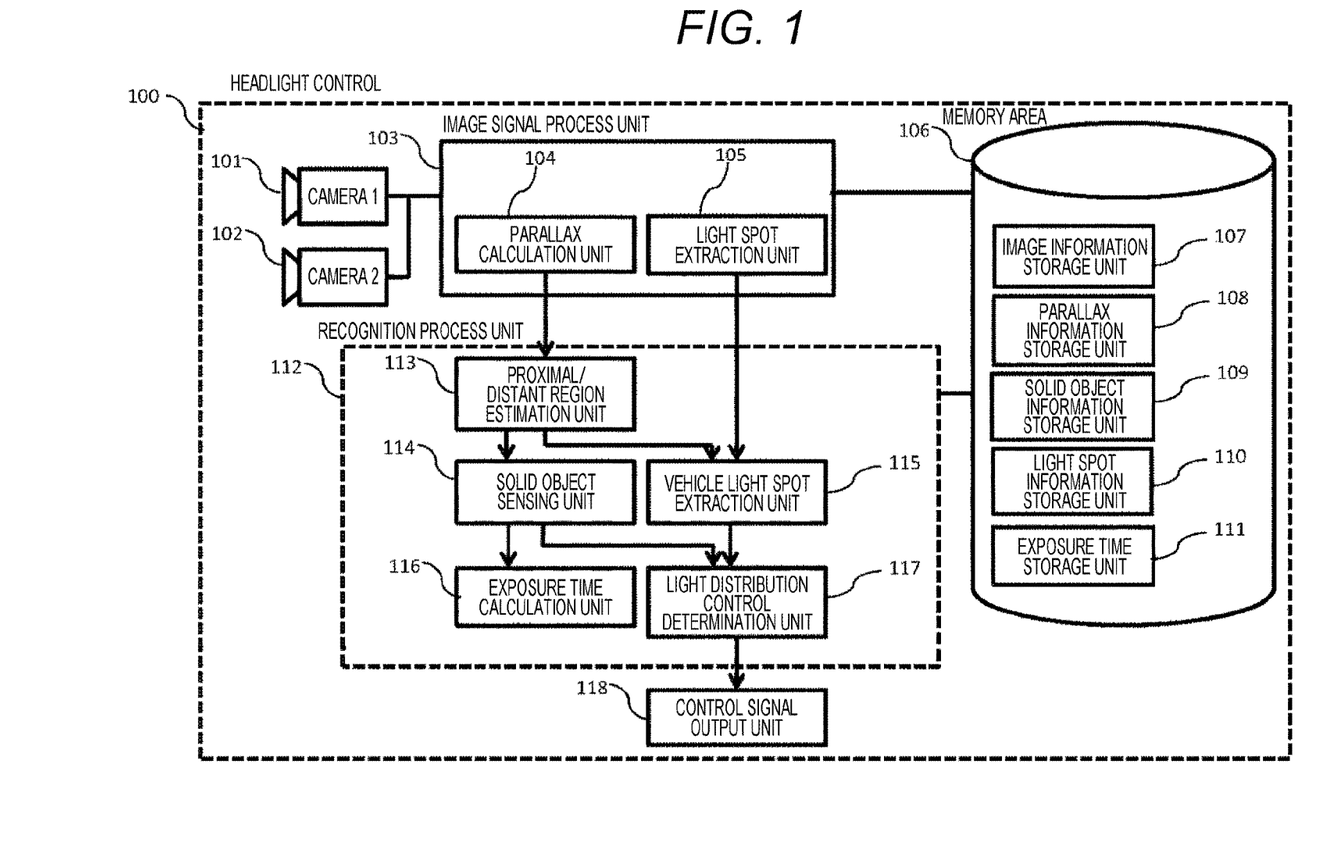
FIG. 1 is a functional block diagram showing a configuration of a headlight control device according to this embodiment.

FIG. 1 is a configuration diagram of a headlight control device 100 according to this embodiment.

The headlight control device 100 according to this embodiment performs control for switching light distribution of a headlight of a host vehicle to a low beam or a high beam by using a front image imaged from the host vehicle. When a front vehicle such as a preceding vehicle and an oncoming vehicle is detected in front of the host vehicle, the headlight control device 100 controls the light distribution to the low beam and when the front vehicle is not detected, the headlight control device 100 controls the light distribution to the high beam. A method of detecting the front vehicle is different in a distant region and a proximal region and distant vehicle detection is performed by light spot extraction and proximal vehicle detection is performed by object detection.

According to the headlight control device 100 according to this embodiment, because the proximal vehicle detection is performed by the object detection, imaging of a light distribution image for the proximal region can be omitted. Therefore, it is possible to prevent a delay in the timing where the light distribution is switched by light distribution control, as in the conventional case of imaging both the light distribution image for the distant region and the light distribution image for the proximal region for the light spot extraction and then performing a detection process of the front vehicle.

The headlight control device 100 has an object detection unit that performs an object detection process on the basis of an image imaged by an imaging device, a light spot extraction unit that performs a light spot extraction process on the basis of the image imaged by the imaging device, and a light distribution control unit that controls an illumination state of a headlight on the basis of a result of the object detection process by the object detection unit and a result of the light spot extraction process by the light spot extraction unit.

When the object detection unit detects a front vehicle to be an object and/or when the light spot extraction unit extracts a light spot such as a taillight or a headlight of the front vehicle, the light distribution control unit generates a headlight control signal for setting the headlight to a proximal illumination state (low beam). On the other hand, when the object is not detected by the object detection unit and the light spot is not extracted by the light spot extraction unit, the light distribution control unit generates a headlight control signal for setting the headlight to a distant illumination state (high beam).

As shown in FIG. 1, the headlight control device 100 has cameras 101 and 102 to be imaging devices, an image signal process unit 103, a memory area 106, a recognition process unit 112, and a control signal output unit 118. The image signal process unit 103 has a parallax calculation unit 104 and a light spot extraction unit 105. The memory area 106 has an image information storage unit 107, a parallax information storage unit 108, a solid object information storage unit 109, a light spot information storage unit 110, and an exposure time storage unit 111. The recognition process unit 112 has a proximal/distant region estimation unit 113, a solid object detection unit 114, a vehicle light spot extraction unit 115, an exposure time calculation unit 116, and a light distribution control determination unit 117.

In this embodiment, solid object detection using a stereo camera is described as an example of a method of detecting a proximal vehicle. However, for example, the solid object detection can be performed by only a monocular camera or solid object detection in which a monocular camera and a radar are combined.

In addition, in this embodiment, a method of detecting the distant vehicle by extracting a light spot of a taillight of the preceding vehicle is described. However, it is also possible to detect the taillight of the preceding vehicle and the headlight of the oncoming vehicle and perform the light distribution control.

When the taillight of the preceding vehicle and the headlight of the oncoming vehicle are detected, brightness of the taillight is lower than that of the headlight and it is difficult to extract both a light spot of the taillight and a light spot of the headlight from images imaged with the same exposure time. Therefore, when the taillight and the headlight are detected, the image for the light distribution can be realized by using images imaged with an exposure time for extracting a low-brightness light spot and an exposure time for extracting a high-brightness light spot. An execution period increases as compared with the case where vehicle light spot extraction is performed with only the taillight light spot as an extraction target. However, even in any case, an effect of reducing a light distribution image for the proximal vehicle detection is obtained.

The camera 101 and the camera 102 are installed to obtain a field of view in front of the host vehicle. In this embodiment, a stereo image necessary for calculating parallax information used for a solid object detection process and an image for light distribution necessary for calculating light spot information used for a vehicle light spot extraction process are imaged.

The stereo image is imaged with a first exposure time set by automatic exposure adjustment to detect a non-self-luminous object. The image for the light distribution is imaged with a second exposure time recorded in the exposure time storage unit 111 to extract the light spot. As the image for the light distribution, a single image of either the camera 101 or the camera 102 may be used or images of both the camera 101 and the camera 102 may be used. The stereo image and the image for the light distribution are imaged at different timings. For example, after the stereo image is imaged, the image for the light distribution is imaged. The second exposure time of the image for the light distribution is different from the first exposure time of the stereo image. At least one of the first exposure time and the second exposure time is controlled according to various conditions (exposure time control unit).

The stereo images imaged by the camera 101 and the camera 102 are input to the image signal process unit 103. The parallax calculation unit 104 of the image signal process unit 103 performs a process for calculating parallax information using the stereo images input from the camera 101 and the camera 102.

The images imaged by the camera 101 and the camera 102 and the parallax information calculated by the image signal process unit 103 are sent to the memory area 106. The imaged images are stored in the image information storage unit 107 of the memory area 106 and the parallax information is stored in the parallax information storage unit 108 of the memory area 106 in a state of the parallax image. In addition, the parallax information is sent to the recognition process unit 112.

The light spot extraction unit 105 of the image signal process unit 103 performs light spot extraction using the image for the light distribution imaged and input by at least one of the camera 101 and the camera 102. As an example of a light spot extraction method, there is a method of extracting a light spot on the basis of a brightness pattern in a single image. Specifically, a binarization process is performed on the image for the light distribution with a brightness value and a high-brightness pixel is extracted. In the case of the light spot of the headlight, a white high-brightness pixel is extracted and in the case of the light spot of the taillight, a red high-brightness pixel is extracted. A grouping process is performed on the extracted high-brightness pixels and a group of adjacent high-brightness pixels is set as a light spot. Further, a filtering process is performed according to a shape, an aspect ratio, and an area of the light spot and narrowing down is performed.

Information of the light spot extracted by the light spot extraction unit 105 is sent to the memory area 106 and is stored in the light spot information storage unit 110 of the memory area 106. The information of the light spot is sent to the vehicle light spot extraction unit 115 of the recognition process unit 112.

The proximal/distant region estimation unit 113 of the recognition process unit 112 estimates a proximal region and a distant region in front of the host vehicle, on the basis of the parallax information from the parallax calculation unit 104. The solid object detection unit 114 performs solid object detection on the basis of the parallax information. The solid object detection result by the solid object detection unit 114 is sent to the memory area 106 and is stored in the solid object information storage unit 109. The solid object detection result is sent to the exposure time calculation unit 116 and the light distribution control determination unit 117.

The exposure time calculation unit 116 calculates an exposure time for imaging the image for the light distribution at a next time, on the basis of the solid object detection result. The exposure time calculated by the exposure time calculation unit 116 is the second exposure time and is sent to the memory area 106 and stored in the exposure time storage unit 111.

The vehicle light spot extraction unit 115 performs the light spot extraction process, on the basis of the image for the light distribution imaged with the second exposure time different from the first exposure time. The vehicle light spot extraction unit 115 calculates whether or not a vehicle light spot such as the headlight and the tail lamp of the preceding vehicle and the oncoming vehicle exists in light spots existing in the distant area estimated by the proximal/distant region estimation unit 113. An extraction result of the vehicle light spot is sent to the light distribution control determination unit 117. The light distribution control determination unit 117 generates a headlight control signal for switching an illumination state of the headlight of the host vehicle, on the basis of the solid object detection result and the extraction result of the vehicle light spot. The control signal output unit 118 outputs the control signal determined by the light distribution control determination unit 117 to a headlight control unit (not shown in the drawings). A headlight device of the host vehicle controls the illumination state of the headlight, on the basis of the headlight control signal output from the light distribution control determination unit 117. The illumination state of the headlight includes at least a distant illumination state (high beam) with a long illumination distance and a proximal illumination state (low beam) with a short illumination distance.

Figure 2:
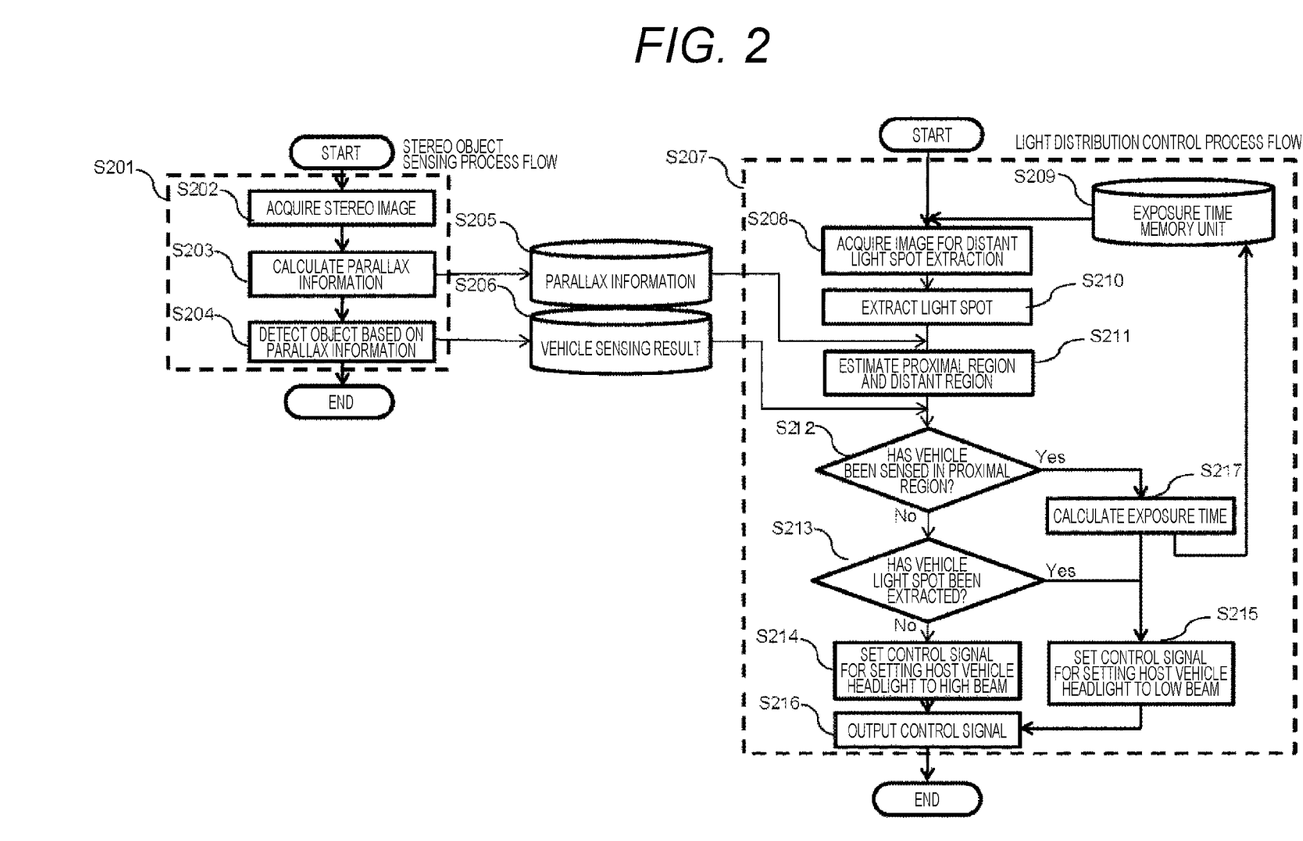
FIG. 2 is a flowchart illustrating a light distribution control process in the headlight control device according to this embodiment.

FIG. 2 is a diagram showing a flow of a light distribution control process according to this embodiment.

The light distribution control process according to this embodiment has a stereo object detection process flow S201 and a light distribution control process flow S207.

First, the stereo object detection process flow S201 (object detection unit) will be described. The image signal process unit 103 acquires stereo images imaged from the camera 101 and the camera 102 with the first exposure time subjected to automatic exposure adjustment (S202). The image signal process unit 103 calculates parallax information from the stereo images acquired in S202 (S203). The parallax information is stored in the parallax information storage unit 108 of the memory area 106 (S205). The solid object detection unit 114 acquires the parallax information from the parallax information storage unit 108, performs object detection on the basis of the parallax information, and performs detection of a front vehicle to be a solid object existing in front of the host vehicle (S204). A vehicle detection result to be a solid object detection result is stored in the solid object information storage unit 109 of the memory area 106 (S206).

Next, the light distribution control process flow S207 (light distribution control unit) will be described. The camera 101 acquires the second exposure time stored in the exposure time storage unit 111 and images the image for the light distribution with the second exposure time (S208). In the image signal process unit 103, the image for the light distribution imaged with the second exposure time is sent to the light spot extraction unit 105 and light spot extraction is performed (S210). Light spot information obtained by the light spot extraction is stored in the light spot information storage unit 110 of the memory area 106.

The recognition process unit 112 estimates the proximal region and the distant region on the basis of the parallax information (S211). As a simplest example of a method of estimating the proximal region and the distant region, a distance of each point on an image from the host vehicle in a real world is calculated on the basis of the parallax information. A threshold process is performed on the distance calculated at each point and a point closer than a threshold is estimated as the proximal region and a point farther than the threshold is estimated as the distant region. When there is a point where the parallax cannot be calculated and the distance cannot be calculated, grouping is performed so that the point belongs to the same region as a closest point where the parallax is calculated, thereby estimating the distant region and the proximal region of the entire image.

The light distribution control determination unit 117 acquires solid object information to be the result of the object detection process from the solid object information storage unit 109, acquires light spot information to be the result of the light spot extraction process from the light spot information storage unit 110, and sets a control signal for setting the headlight of the host vehicle to a low beam or a high beam, on the basis of the solid object information and the light spot information. When the vehicle is detected in the proximal region by referring to the solid object information (S212), a control signal for setting the headlight of the host vehicle to the low beam is set (S215). The headlight control device 100 performs vehicle detection by solid object detection in the proximal region and performs the vehicle detection by vehicle light spot extraction in the distant region. That is, because the vehicle detection is performed by referring to the solid object information, not the vehicle light spot extraction, in the proximal region, it is unnecessary to image the image for the light distribution to extract the light spot of the proximal vehicle. Therefore, it is possible to reduce the number of images required for the light distribution control and to inhibit an increase in the execution period of the light distribution process.

In addition, in this embodiment, when the vehicle has been detected on the basis of the solid object detection result, the vehicle light spot extraction process can be omitted and the control signal can be switched, so that a process load can be reduced.

In S212, when it is determined that the vehicle has not been detected in the proximal region (No in S212), the vehicle light spot extraction unit 105 searches for the vehicle light spot (S213). The search for the vehicle light spot is performed by extracting the vehicle light spot from the light spots existing in the distant region estimated in S211. The process load can be reduced by limiting a search range of the vehicle light spot to the distant region.

When the vehicle light spot has been extracted (Yes in S213), a control signal for setting the headlight of the host vehicle to the low beam is set (S215). When the vehicle light spot has not been extracted in S213, it is determined that neither the oncoming vehicle nor the preceding vehicle exists in front of the host vehicle and a control signal for setting the headlight of the host vehicle to the high beam is set (S214).

To control the headlight according to the control signal set in S214 or S215, the control signal output unit 118 outputs the control signal to the headlight control unit (S216).

Figure 3:
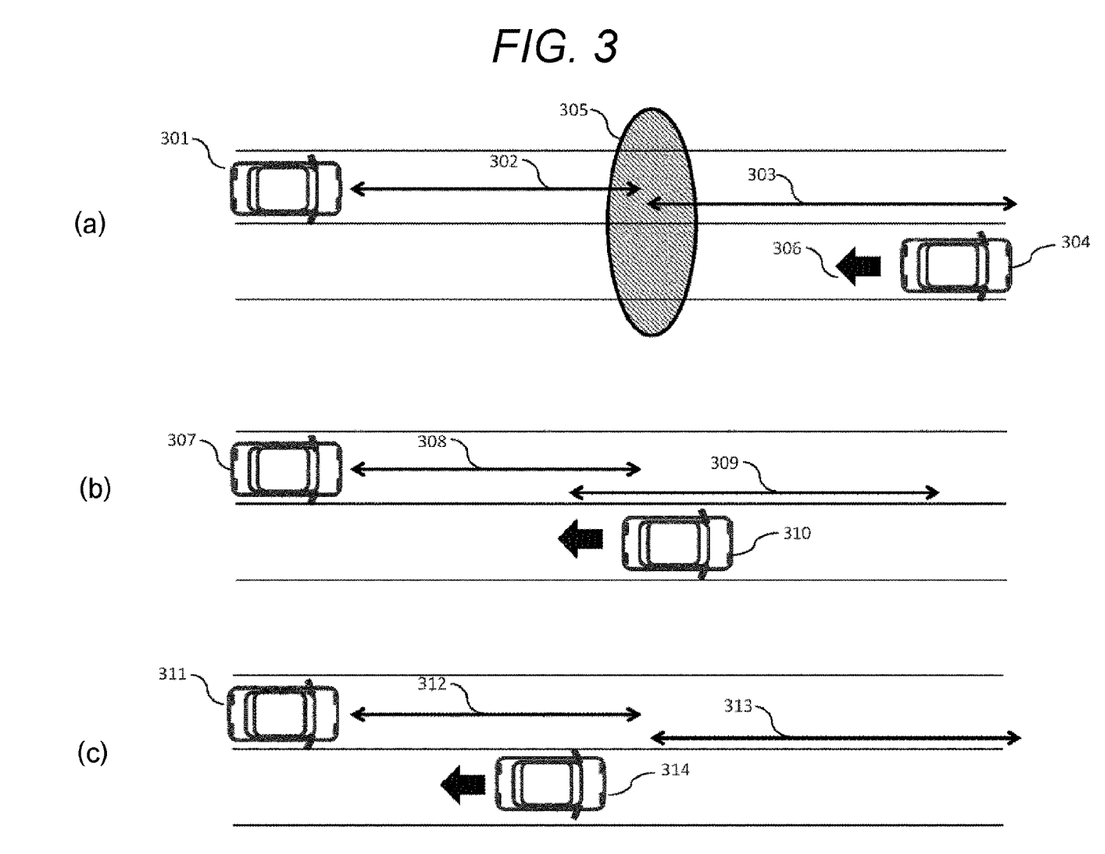
FIG. 3 is an explanatory diagram illustrating an example of setting an exposure time for imaging an image for light distribution according to this embodiment.
Figure 4:
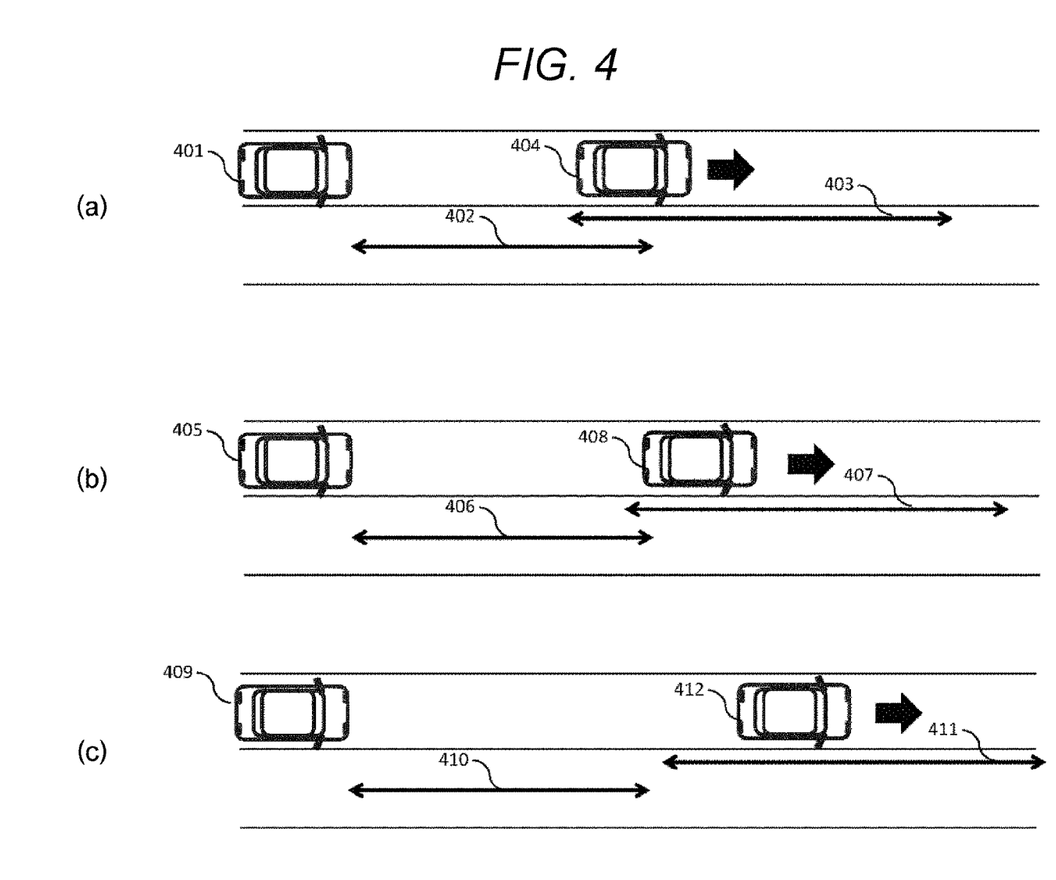
FIG. 4 is an explanatory diagram illustrating an example of setting an exposure time for imaging an image for light distribution according to this embodiment.
Figure 5:
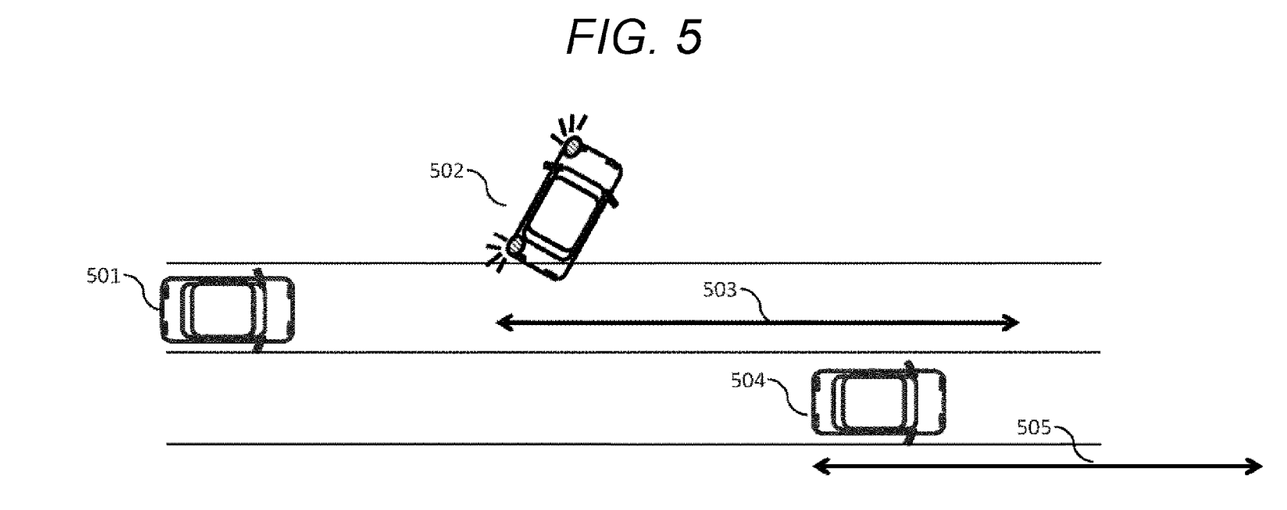
FIG. 5 is an explanatory diagram illustrating an example of setting an exposure time for imaging an image for light distribution according to this embodiment.

Next, a method of adjusting an exposure time for imaging the image for the light distribution to extract the light spot in S217 will be described below using FIGS. 3 to 5. FIGS. 3 to 5 are explanatory diagrams illustrating an example of setting the exposure time for imaging the image for the light distribution according to this embodiment.

The second exposure time for imaging the image for the light distribution is controlled on the basis of a detectable distance where the solid object detection unit 114 can detect the proximal vehicle (exposure time control unit). The purpose of adjusting the exposure time for imaging the image for the light distribution is to adjust a detectable distance of the distant vehicle detection. A distance where the light spot can be extracted can be adjusted by the exposure time. When the exposure time is longer, a distant light spot can be extracted and when the exposure time is shorter, a proximal light spot can be extracted.

In the solid object detection by a stereo process, a detection distance is shorter as compared with the vehicle light spot extraction and detection performance becomes unstable when the detection distance increases. Therefore, it is thought that vehicle detection may be interrupted in the vicinity of switching between the proximal vehicle detection performed by the solid object detection and the distant vehicle detection performed by the vehicle light spot extraction. For this reason, to prevent the vehicle detection from being interrupted in the vicinity of switching between the proximal vehicle detection and the distant vehicle detection, a process for partially overlapping a detectable distance of the proximal vehicle detection and a detectable distance of the distant vehicle detection in the vicinity of the switching is executed. Therefore, the second exposure time is controlled so that a detectable distance where the solid object detection unit 114 can detect the solid object and a light spot extractable distance where the vehicle light spot extraction unit 115 can extract the light spot are set to partially overlap each other.

When the vehicle is not detected in both the proximal vehicle detection and the distant vehicle detection, an exposure time is calculated so that a light spot of a vehicle appearing from a farthest position where the distant vehicle detection is enabled can be extracted.

FIG. 3 is a diagram showing a state in which a front vehicle 304 traveling in front of a host vehicle 301 approaches the host vehicle 301 relatively. In FIG. 3(a), the host vehicle 301 and the front vehicle 304 located in front of the host vehicle 301 are shown. An arrow 306 represents a relative approach of the host vehicle 301 and the front vehicle 304. In FIG. 3(a), a distance 302 is a detectable distance by proximal vehicle detection and a distance 303 is a detectable distance by distant vehicle detection.

As shown in FIG. 3(a), when the front vehicle 304 is detected by the distant vehicle detection and the front vehicle 304 and the host vehicle 301 approach each other, it is thought that vehicle detection in the vicinity 305 of switching between the proximal vehicle detection and the distant vehicle detection may be interrupted. Therefore, as shown in FIG. 3(b), an exposure time is calculated so that a taillight or a headlight of the front vehicle 304 can be continuously extracted as a light spot.

The exposure time of the image for the light distribution used for detecting the distant vehicle is calculated on the basis of a detectable distance 308 where the solid object detection unit 114 (object detection unit) can detect the vehicle. In the exposure time calculation process (S217), the exposure time of the image for the light distribution in the distant vehicle detection is calculated from the detection result of the proximal vehicle detection so that a detectable distance 309 of the distant vehicle detection and the detectable distance 308 of the proximal vehicle detection partially overlap each other. As a result, it is possible to adjust the detectable distance 309 of the distant vehicle detection and perform the distant vehicle detection without interruption until the front vehicle 310 enters the distance 308 where the proximal vehicle detection is enabled.

As shown in FIG. 3(c), when a front vehicle 314 exists at a distance 312 where the vehicle can be stably detected by the proximal vehicle detection and the front vehicle 314 and a host vehicle 311 approach each other, it is though that the front vehicle 314 gets out of an image due to passing or overtaking. Therefore, to pay attention to the further front of the vehicle 314, an exposure time is set so that the detectable distance of the distant vehicle detection becomes a distance where it is possible to extract a light spot of a vehicle appearing from a farthest position from the host vehicle 311.

In the example shown in FIG. 3, the case where the front vehicle detects a preceding vehicle travelling in the same direction as a traveling direction of the host vehicle is detected has been described. However, even in the case where the front vehicle is an oncoming vehicle travelling in a direction opposite to the traveling direction of the host vehicle, the distant vehicle detection can be performed by extracting the headlight instead of the taillight as the light spot. FIGS. 4(a) to 4(c) are diagrams showing a state in which a front vehicle 404 is gradually separated from a host vehicle 401. In FIGS. 4(a) to 4(c), the host vehicle 401 and the front vehicle 404 located in front of the host vehicle 401 are shown. A distance 402 is set as a distance where the vehicle can be detected by the proximal vehicle detection and a distance 403 is set as a distance where the vehicle can be detected by the distant vehicle detection. An arrow 400 represents separation of the host vehicle 401 and the front vehicle 404. As shown in FIG. 4(a), even when the front vehicle 404 is detected within a range of the distance 402 by the proximal vehicle detection and the front vehicle 404 is separated from the host vehicle 401, vehicle detection in the vicinity of switching between the proximal vehicle detection and the distant vehicle detection may be interrupted.

Therefore, an exposure time is calculated so that a taillight of the front vehicle 404 can be extracted as a light spot, on the basis of a distance to the front vehicle 404 calculated by the proximal vehicle detection. As a result, the detectable distance 403 of the distant vehicle detection by the vehicle light spot extraction is adjusted to include the distance to the front vehicle 404. That is, an exposure time of the image for the light distribution in the distant vehicle detection is adjusted from a detection result of the proximal vehicle detection so that the detectable distance 403 of the distant vehicle detection and the detectable distance 402 of the proximal vehicle detection partially overlap each other. To calculate the exposure time on the basis of the distance from the host vehicle 401 to the front vehicle 404, it is necessary to experimentally calculate characteristics of the distance and the exposure time in advance.

As shown in FIG. 4(*b*), when a front vehicle 408 deviates from a detectable distance 406 of the proximal vehicle, an exposure time is calculated so that a taillight of the front vehicle 408 can be continuously extracted as a light spot. As a result, a detectable distance 407 of the distant vehicle detection is adjusted.

As shown in FIG. 4(*c*), when a front vehicle 412 is detected by the distant vehicle detection and the front vehicle 412 and a host vehicle 409 are separated from each other, an exposure time of the image for the light distribution is calculated to adjust a detectable distance 411 of the distant vehicle detection so that a light spot of the front vehicle can be continually extracted to a farthest position where the distant vehicle detection is enabled. If the movement of the vehicle detected by the proximal vehicle detection can be predicted, it is possible to perform adjustment of the exposure time of the image for the light distribution based on a prediction result.

FIG. 5 shows a state in which a front vehicle 502 turning left exists in front of a host vehicle 501 and a front vehicle 504 travels as a preceding vehicle in front of the front vehicle 502. In FIG. 5, it is assumed that the vehicle 502 travels in front of the host vehicle and the vehicle 504 travels in front of the vehicle 502 and both the vehicles 502 and 504 are detected by the proximal vehicle detection.

It is assumed that an exposure time of an image for light distribution is set according to a distance 503 where a taillight of the front vehicle 502 closest to the host vehicle 501 can be extracted as a light spot. When the front vehicle 502 tries to turn left, what needs to be next noticed is the front vehicle 504 existing in front of the front vehicle 502. Therefore, if the movement of the vehicle 502 trying to turn left can be predicted by an indicator or the like, before the vehicle 502 moves to the outside of a screen, an exposure time of an image for light distribution is set according to a distance 505 where a taillight of the vehicle 504 can be extracted as a light spot That is, the movement of the front vehicle is predicted and the exposure time of the image for the light distribution is set according to a distance to be next noticed.

Although the embodiments of the present invention have been described, the present invention is not limited to the embodiments and various design changes can be performed without departing from the spirit of the invention described in claims. For example, the embodiments are described in detail to facilitate the description of the present invention and the present invention is not limited to including all of the described configurations. In addition, a part of the configurations of the certain embodiment can be replaced by the configurations of other embodiments or the configurations of other embodiments can be added to the configurations of the certain embodiment. In addition, for a part of the configurations of the individual embodiments, addition/removal/replacement of other configurations can be performed.

REFERENCE SIGNS LIST

100 headlight control device
101 camera 1
102 camera 2
103 image signal process unit
104 parallax calculation unit
105 light spot extraction unit
106 memory area
107 image information storage unit
108 parallax information storage unit
109 solid object information storage unit
110 light spot information storage unit
111 exposure time storage unit
112 recognition process unit
113 proximal/distant region estimation unit
114 solid object detection unit
115 vehicle light spot extraction unit
116 exposure time calculation unit
117 light distribution control determination unit
118 control signal output unit
301, 307, 311, 401, 405, 409, 501 host vehicle
302, 308, 312, 402, 405, 409 detectable distance of proximal vehicle detection
303, 309, 313, 403, 407, 411, 503, 505 detectable distance of distant vehicle detection
304, 310, 314, 404, 408, 412, 502, 502 front vehicle
305 switching range of proximal vehicle detection and distant vehicle detection
306 relative movement of host vehicle and front vehicle

The invention claimed is:

1. A headlight control device comprising:
an object detection unit configured to perform an object detection process on the basis of an image imaged by an imaging device;
a light spot extraction unit configured to perform a light spot extraction process on the basis of the image imaged by the imaging device; and
a light distribution control unit configured to control an illumination state of a headlight on the basis of a result of the object detection process and a result of the light spot extraction process, wherein:
the object detection unit is configured to perform the object detection process on the basis of an image imaged with a first exposure time, and
the light spot extraction unit is configured to perform the light spot extraction process on the basis of an image imaged with a second exposure time different from the first exposure time.

2. The headlight control device according to claim 1, further comprising: an exposure time control unit configured to control at least one of the first exposure time and the second exposure time.

3. The headlight control device according to claim 2, wherein the exposure time control unit is configured to control the second exposure time on the basis of an object detectable distance where the object detection unit is able to detect an object.

4. The headlight control device according to claim 2, wherein the exposure time control unit is configured to control the second exposure time so that an object detectable distance where the object detection unit is able to detect an object and a light spot extractable distance where the light spot extraction unit is able to extract a light spot are set to partially overlap each other.

5. The headlight control device according to claim 1, wherein
the illumination state of the headlight includes at least a distant illumination state with a long illumination distance and a proximal illumination state with a short illumination distance, and
the light distribution control unit is configured to generate a headlight control signal for setting the headlight to the proximal illumination state, when the object detection unit detects an object and/or when the light spot extraction unit extracts a light spot.

6. The headlight control device according to claim 5, wherein the light distribution control unit is configured to generate a headlight control signal for setting the headlight to the distant illumination state, when the object is not detected by the object detection unit and the light spot is not extracted by the light spot extraction unit.

7. The headlight control device according to claim 1, wherein
the imaging device is a stereo camera,
the object detection unit is configured to detect an object on the basis of distance information obtained by a parallax image of the stereo camera, and
the light spot extraction unit is configured to extract a light spot on the basis of a brightness pattern in a single image.

8. A headlight control device comprising:
an object detection unit configured to perform an object detection process on the basis of an image imaged by an imaging device;
a light spot extraction unit configured to perform a light spot extraction process on the basis of the image imaged by the imaging device; and
a light distribution control unit configured to control an illumination state of a headlight on the basis of a result of the object detection process and a result of the light spot extraction process, wherein:
the illumination state of the headlight includes at least a distant illumination state with a long illumination distance and a proximal illumination state with a short illumination distance, and
the light distribution control unit is configured to generate a headlight control signal for setting the headlight to the proximal illumination state, when the object detection unit detects an object and/or when the light spot extraction unit extracts a light spot.

9. The headlight control device according to claim 8, wherein the light distribution control unit is configured to generate a headlight control signal for setting the headlight to the distant illumination state, when the object is not detected by the object detection unit and the light spot is not extracted by the light spot extraction unit.

10. The headlight control device according to claim 8, wherein
the imaging device is a stereo camera,
the object detection unit is configured to detect an object on the basis of distance information obtained by a parallax image of the stereo camera, and
the light spot extraction unit is configured to extract a light spot on the basis of a brightness pattern in a single image.

* * * * *